United States Patent [19]
Campbell et al.

[11] Patent Number: 4,505,279
[45] Date of Patent: Mar. 19, 1985

[54] STAGGERED SPIRAL RASP BAR SEGMENTS FOR AXIAL FLOW COMBINES

[75] Inventors: Steven J. Campbell, Curitiba, Brazil; Keith A. Stickley; David R. Klingensmith, both of New Holland, Pa.

[73] Assignee: Sperry Corporation, New Holland, Pa.

[21] Appl. No.: 521,290

[22] Filed: Aug. 8, 1983

[51] Int. Cl.³ .............................................. A01F 12/20
[52] U.S. Cl. ............................. 130/27 T; 130/27 HA; 130/27 N
[58] Field of Search ................ 130/27 R, 27 T, 27 H, 130/27 HF, 27 HA, 27 G, 27 N; 56/14.6

[56] References Cited

U.S. PATENT DOCUMENTS

| | | | |
|---|---|---|---|
| 2,266,806 | 12/1941 | Ronning | 130/27 HA |
| 3,410,271 | 11/1968 | Hengen et al. | 130/27 R |
| 3,481,344 | 12/1969 | Stokland | 130/27 R |
| 3,512,533 | 5/1970 | Loewen | 130/27 R |
| 3,664,100 | 5/1972 | Rowland-Hill | 130/27 HA |
| 3,669,121 | 6/1972 | Rowland-Hill | 130/27 T |
| 3,982,548 | 9/1976 | Stamp et al. | 130/27 T |
| 4,148,323 | 4/1979 | McMillen et al. | 130/27 T |
| 4,178,943 | 12/1979 | West | 130/27 T |
| 4,250,897 | 2/1981 | Glaser | 130/27 T |
| 4,362,168 | 12/1982 | Hengen et al. | 130/27 H |

*Primary Examiner*—Robert P. Swiatek
*Assistant Examiner*—David L. Tarnoff
*Attorney, Agent, or Firm*—Larry W. Miller; Frank A. Seemar; Darrell F. Marquette

[57] ABSTRACT

An axial flow combine harvester is disclosed wherein the threshing rotors are provided with segmented rasp bars staggered around the circumference of the rotors and spiralled with respect to the axis of rotation of the rotors. Each rasp bar segment is circumferentially offset approximately 60 degrees relative to each other to spread the threshing forces around the circumference of the threshing rotor, minimizing variations in threshing forces and increasing the life of related components.

13 Claims, 3 Drawing Figures

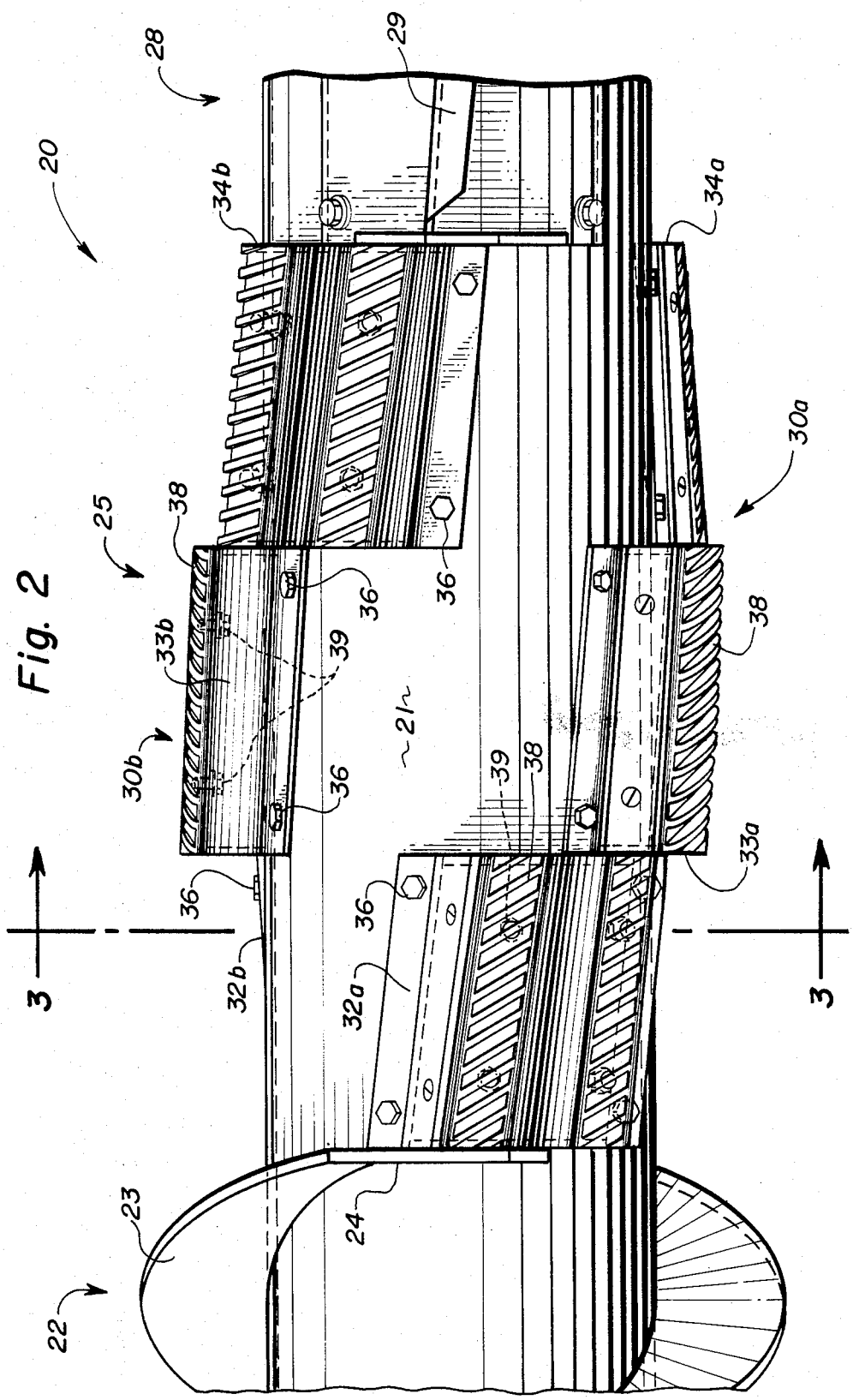

STAGGERED SPIRAL RASP BAR SEGMENTS FOR AXIAL FLOW COMBINES

BACKGROUND OF THE INVENTION

The present invention relates generally to axial flow combine harvesters and, more particularly, to an improved rasp bar configuration for the threshing rotors.

It has been found that straight rasp bars positioned approximately 180 degrees apart along the circumference of the threshing rotor encounter rotor torque variations as the rasp bars pass over the crop in the rotor concave area. When large amounts of crop material is fed into the rotors, particularly under conditions where the crop material is green, wet or includes tough straw, an objectionable rumbling noise is produced. It is felt that this rumble occurs when the rasp bars overrun the crop mat in the rotor chamber causing the crop material to be alternately compressed and released.

As the circumferentially opposed rasp bars alternately pass over the concave area and compress the crop in the threshing process, the torque required to power the rotors fluctuates, causing a great exertion of force on the concave, concave supports and drive elements. These conditions induce fatigue stresses into the rotor gearboxes and couplings, as well as in the concaves and supports. It has also been noted that there is a tendency of somewhat wet or green straw and/or weeds to roll into a rope, entrapping grain and resulting in additional grain losses as the entrapped grain becomes discharged from the machine.

SUMMARY OF THE INVENTION

It is an object of this invention to overcome the aforementioned disadvantages of the prior art by providing segmented, staggered, spiral rasp bars for the threshing rotors in axial flow combines.

It is another object of this invention to minimize the rotor torque variations during the harvesting of crop material.

It is still another object of this invention to eliminate the rumbling noise associated with axial flow combines when harvesting tough straw crops.

It is a feature of this invention that the rasp bar segments are circumferentially offset around the circumference of the threshing rotor in an axial flow combine.

It is an advantage of this invention that a greater throughput is provided in an axial flow combine for a given horsepower requirement.

It is another advantage of this invention that fatique stresses in rotary gearboxes, couplings, concaves and concave supports are reduced.

It is another feature of this invention that the tendency of wet, green crop material to roll into a rope within the rotor chamber is reduced.

It is still another advantage of this invention that grain would not be entrapped within ropes formed in the rotor chamber.

It is a further object of this invention to provide a rasp bar configuration for the threshing rotor in an axial flow combine harvester which is durable in construction, inexpensive of manufacture, carefree of maintenance, facile in assemblage and simple and effective in use.

These and other objects, features and advantages are accomplished according to the instant invention by providing an axial flow combine harvester wherein the threshing rotors are provided with segmented rasp bars staggered around the circumference of the rotors and spiralled with respect to the axis of rotation of the rotors. Each rasp bar segment is circumferentially offset approximately 60 degrees relative to each other to spread the threshing forces around the circumference of the threshing rotor minimizing variations in threshing forces and increasing the life of related components.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is an enlarged partial elevational view of the threshing section of the rotor shown in FIG. 1, corresponding to lines 2—2.

DETAILED DESCRIPTION OF THE PREFERRED EMBODIMENT

Figure 1:
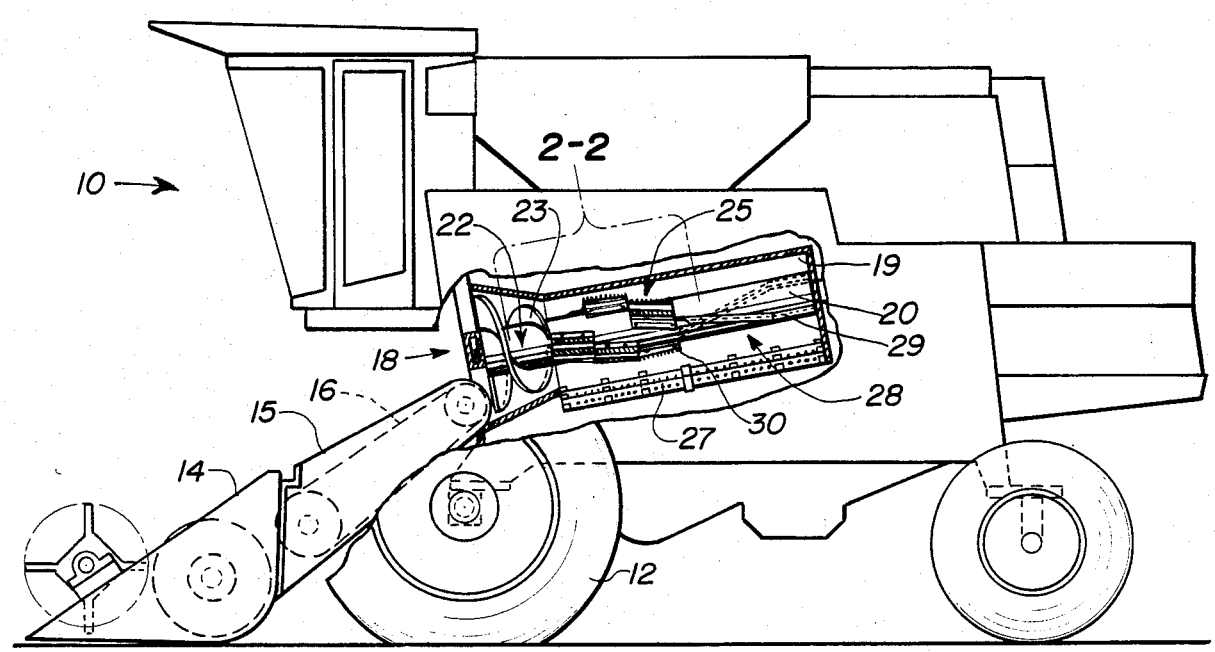
FIG. 1 is a side elevational view of an axial flow combine harvester incorporating the principles of the instant invention, parts of the side sheet of the combine being broken away to better show the threshing and separating rotor.

Referring now to the drawings and, particularly to FIG. 1, a side elevational view of an axial flow combine harvester can be seen. The harvester 10 is mobilely supported over the ground by wheeled frame 12. A crop harvesting header 14 forwarded supported from the frame 12 is generally operable to collect crop material to be harvested and transfer it to a feederhouse 15 interconnecting the header 14 and the frame 12. The feederhouse 15 is provided with a conveyor 16 to transport collected crop material rearwardly into the threshing unit 18.

The threshing unit 18 includes a generally longitudinally disposed threshing and separating rotor 20 rotatably mounted in the frame 12 in a rotor chamber 19. The threshing rotor includes an infeed portion 22 having auger flighting 23 circumferentially mounted thereon to receive crop material from the conveyor 16 in the feederhouse 15 and convey it rearwardly along the threshing and separating rotor 20. Immediately rearwardly of the infeed portion 22 is a threshing portion 25 having rasp bars 30 mounted on the rotor 20 for cooperation with an arcuate concave 27 to thresh crop material in a manner well known in the art. Rearwardly of the threshing portion 25 is the separating portion 28 including separating ribs 29 cooperable with the concave 27 immediately adjacent thereto to separate threshed grain from the waste crop material in a manner also conventional in the art.

Figure 3:
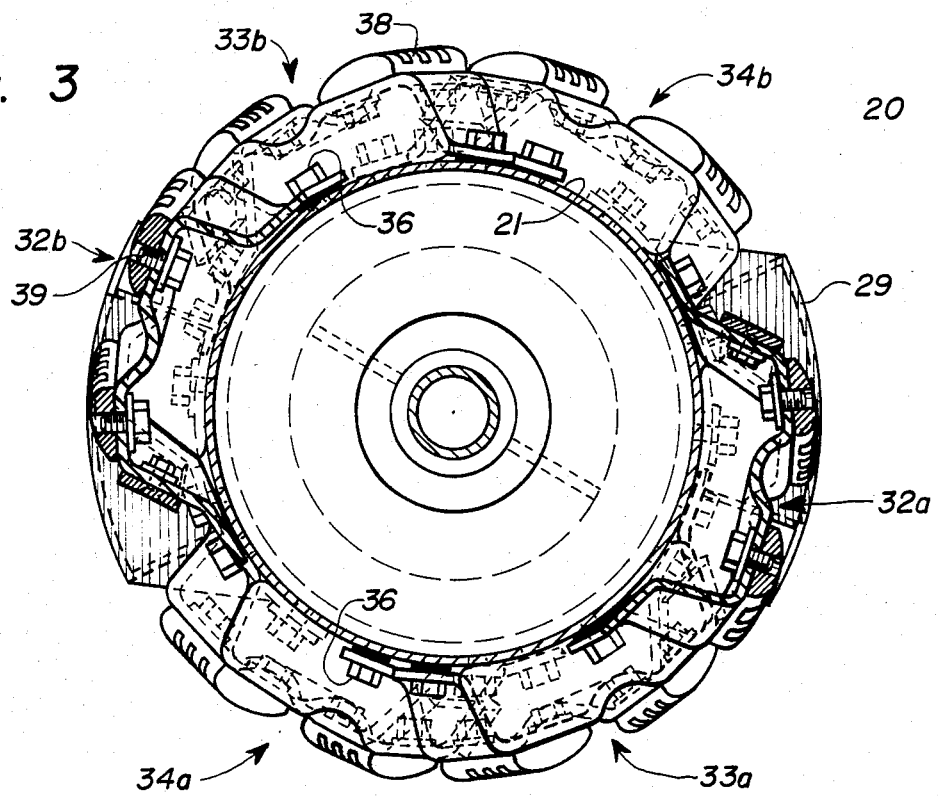
FIG. 3 is a cross sectional view through the threshing section of the threshing and separating rotor taken along lines 3—3 of FIG. 2.

Referring now to FIGS. 2 and 3, the improved rasp bar configuration can best be seen. The threshing rotor 20 is shown provided with two rasp bars 30a,30b, each of which are divided into three circumferentially offset segments 32,33,34. The forwardmost segment 32 of each rasp bar 30a,30b is positioned immediately adjacent to the auger flighting 23 on the infeed portion 22 such that crop material conveyed off the end 24 of each auger flight 23 is received by the forwardmost segment 32 to initiate the threshing process. The medial rasp bar segment 33 is positioned immediately rearwardly of the forwardmost segment 32 and circumferentially offset relative thereto. Similarly, the rearwardmost segment 34 is positioned immediately rearwardly of the medial segment 33 and offset around the circumference of the threshing rotor 20. The separating ribs 29 are mounted on the separating section 28 at a position immediately adjacent to and trailing the corresponding rearwardmost rasp bar segment 34. In the embodiment shown in FIGS. 1-3, each rasp bar segment 32-34 is offset approximately 60° around the circumferential surface 21 from the adjacent segment. As is best seen in FIG. 2, the forwardmost segment 32a of the first rasp bar 30a is circumferentially offset around the circumference of the threshing rotor 20 from the rearwardmost segment 34b of the second rasp bar 30b. Corresponding segments of opposing rasp bars 30a,30b are circumferentially offset approximately 180 degrees relative to each other.

Each rasp bar segment 32,33,34 is individually connected to the circumferential surface 21 of the threshing rotor 20 by fastening bolts 36. Each segment 32,33,34 is shown as including a double set of rasps 38 detachably connected to the segment by screws 39. It can readily be seen that each segment 32-34 is individually connected to the threshing rotor 20 and can be removed therefrom without disturbing adjacent segments. Furthermore, each rasp 38 can also be replaced independently of other rasps 38. Depending upon the crop to be harvested and the condition of that crop, the operator may optionally choose to have rasp bar segments 32-34 having only one rasp 38, or an appropriate combination of double rasp and single rasp segments.

It can also be seen from FIGS. 2 and 3, that the rasp bar segments 32-34 are mounted on the circumferential surface 21 of the threshing rotor 20 in a spiralled manner. By spiralling the rasp bar segments 32-34 and staggering them in a circumferentially offset manner around the surface 21 of the threshing rotor 20, the power requirement for threshing crop material in the rotor chamber 19 is spread around the circumference of the threshing rotor 20, resulting in lower torque peaks and a greater throughput for a given horsepower requirement. Since the torque peaks are lower, the concaves 27 and their supports (not shown), as well as the associated driving components (not shown) for rotating the threshing rotor 20, are subjected to less stress and shock loading, enabling these components to have a longer life. Since the crop does not have a continuous rasp bar 30 against which to rollingly engage, wet, green or tough straw does not have as great a tendency to form ropes and entrap grain. Furthermore, since the threshing forces are more evenly distributed around the threshing portion 25 of the rotor 20 and perhaps since there is less rope formation, rumbling noises have been found to be less frequent. The segmenting of each rasp bar 30 provides for a convenient manufacturing of spiral rasp bars 30. The segmental concept allows for a variety of combinations of blades, combs, single rasp bars and double rasp bars so that the rasp bar configuration can be conveniently adapted to a given crop or crop condition to provide optimum threshing operation at the lowest power requirement.

It will be understood that changes in the details, materials, steps and arrangement of parts which have been described and illustrated to explain the nature of the invention will occur to and may be those skilled in the art upon a reading of this disclosure within the principles and scope of the invention. The foregoing description illustrates the preferred embodiment of the invention; however, concepts based upon the description may be employed in other embodiments without departing from the scope of the invention. Accordingly, the following claims are intended to protect the invention broadly as well as in the specific form as shown.

Having thus described the invention, what is claimed is:

1. In an axial flow combine harvester having a mobile frame; a threshing rotor rotatably mounted on said frame for rotation about a generally longitudinally extending axis, said threshing rotor being operable to thresh crop material and separate grain from said crop material, said rotor including a threshing section having mounted thereon a rasp bar for rotation with said rotor; a concave supported on said frame adjacent said threshing rotor for cooperation with said rasp bar to thresh crop material; crop gathering means forwardly mounted on said frame to collect crop material and feed said crop material into said threshing and separating rotor; and drive means for operatively powering said threshing rotor and said crop gathering means, the improvement comprising:

said rasp bar being divided into a plurality of longitudinally extending segments, each said segment being connected to said threshing rotor at a position circumferentially offset relative to the adjacent said rasp bar segment, each said rasp bar segment being spirally curved at least partially around the axis of rotation of said rotor and being positioned in a non-overlapping relationship relative to the axis of said threshing rotor with respect to circumferentially adjacent rasp bar segments.

2. The axial flow combine harvester of claim 1 wherein said threshing and separating rotor includes two said rasp bars, each said rasp bar having three segments, each said segment being circumferentially offset approximately 60 degrees relative to the adjacent said rasp bar segment.

3. The axial flow combine harvester of claim 2 wherein the forwardmost segment of each said rasp bar is circumferentially offset approximately 60 degrees from the rearwardmost segment of the adjacent said rasp bar.

4. The axial flow combine harvester of claim 3 wherein said threshing and separating rotor includes a separating portion having a separating rib corresponding to each said rearwardmost segment mounted thereon.

5. The axial flow combine harvester of claim 4 wherein each said separating rib is mounted adjacent the corresponding said rearwardmost rasp bar segment at a position rotational trailing said corresponding rearwardmost segment.

6. The axial flow combine harvester of claim 5 wherein each said rasp bar segment is individually connected to said threshing section of said threshing and separating rotor.

7. The axial flow combine harvester of claim 6 wherein said threshing section is provided with a plurality of mounting locations so that the extent of circumferential offset between adjacent rasp bar segments can be selectively varied.

8. The axial flow combine harvester of claim 1 wherein the rasp bar segments are evenly spaced around the threshing section of said threshing and separating rotor to even out threshing loads associated with the engagement of crop material between said rasp bar segments and said concave.

9. The axial flow combine harvester of claim 8 wherein each said rasp bar segment does not longitudinally overlap the adjacent said rasp bar segment.

10. The axial flow combine harvester of claim 9 wherein each said rasp bar segment is provided with removable rasps to enable the rasp bar configuration to be changed to provide optimum threshing operation for varying crop conditions.

11. The axial flow combine harvester of claim 10 wherein said rasp bar segments are provided along the entire longitudinal length of said threshing section.

12. The axial flow combine harvester of claim 11 wherein each said rasp bar segment is individually connected to said threshing section of said threshing and separating rotor.

13. The axial flow combine harvester of claim 12 wherein said threshing section is provided with a plurality of mounting locations so that the extent of circumferential offset between adjacent rasp bar segments can be selectively varied.

* * * * *